United States Patent [19]

Richardson et al.

[11] Patent Number: 5,413,030
[45] Date of Patent: May 9, 1995

[54] SELF-ENERGIZING SNUBBER FOR A HYDRAULIC MOTOR

[75] Inventors: Warner G. Richardson, Shorewood; Steven R. Wells, Aurora, both of Ill.

[73] Assignee: Caterpillar Inc., Peoria, Ill.

[21] Appl. No.: 198,759

[22] Filed: Feb. 17, 1994

[51] Int. Cl.⁶ .................. F15B 15/22; F01B 15/00
[52] U.S. Cl. ............................ 91/408; 92/85 B
[58] Field of Search .............. 91/407, 408; 92/52, 92/143, 85 R, 85 B

[56] References Cited

U.S. PATENT DOCUMENTS

| | | | |
|---|---|---|---|
| 2,778,343 | 1/1957 | Crosetto et al. | 91/407 |
| 2,991,759 | 7/1961 | Pilch | 91/407 |
| 3,592,108 | 7/1971 | Rosaen | 92/52 X |
| 3,677,141 | 7/1972 | Lagerqvist et al. | 91/407 X |
| 3,845,694 | 11/1974 | Berg | 91/402 |
| 3,998,132 | 12/1976 | Rasigade | 91/407 X |
| 4,250,793 | 2/1981 | Berg | 91/407 |
| 4,440,068 | 4/1984 | Tootle | 92/85 B X |

FOREIGN PATENT DOCUMENTS 718261  9/1965  Canada ................ 92/143

Primary Examiner—Edward K. Look
Assistant Examiner—Hoang Nguyen
Attorney, Agent, or Firm—John W. Grant

[57] ABSTRACT

Snubbers are useful in dampening inertia loads at the end of stroke movement of a hydraulic motor. The known snubbers usually restrict fluid flow therethrough in the non-snubbing mode thereby slowing the response of the motor in the opposite direction. The subject self-energizing snubber includes a snubber piston which is moved from a first operative position to an intermediate operative position by contact with an end surface and then hydraulically moved to a second position by differential pressure established between an actuating chamber and a fluid passage. The snubber piston defines a variable rate flow path continuously communicating the actuating chamber with the passage. A maximum flow rate is established through the flow path at the first operative position while a minimum flow rate is established through the flow path at the second operative position. An intermediate flow rate is established through the flow path at the intermediate operative position with the intermediate flow rate selected to establish the pressure differential between the actuating chamber and the passage.

5 Claims, 1 Drawing Sheet

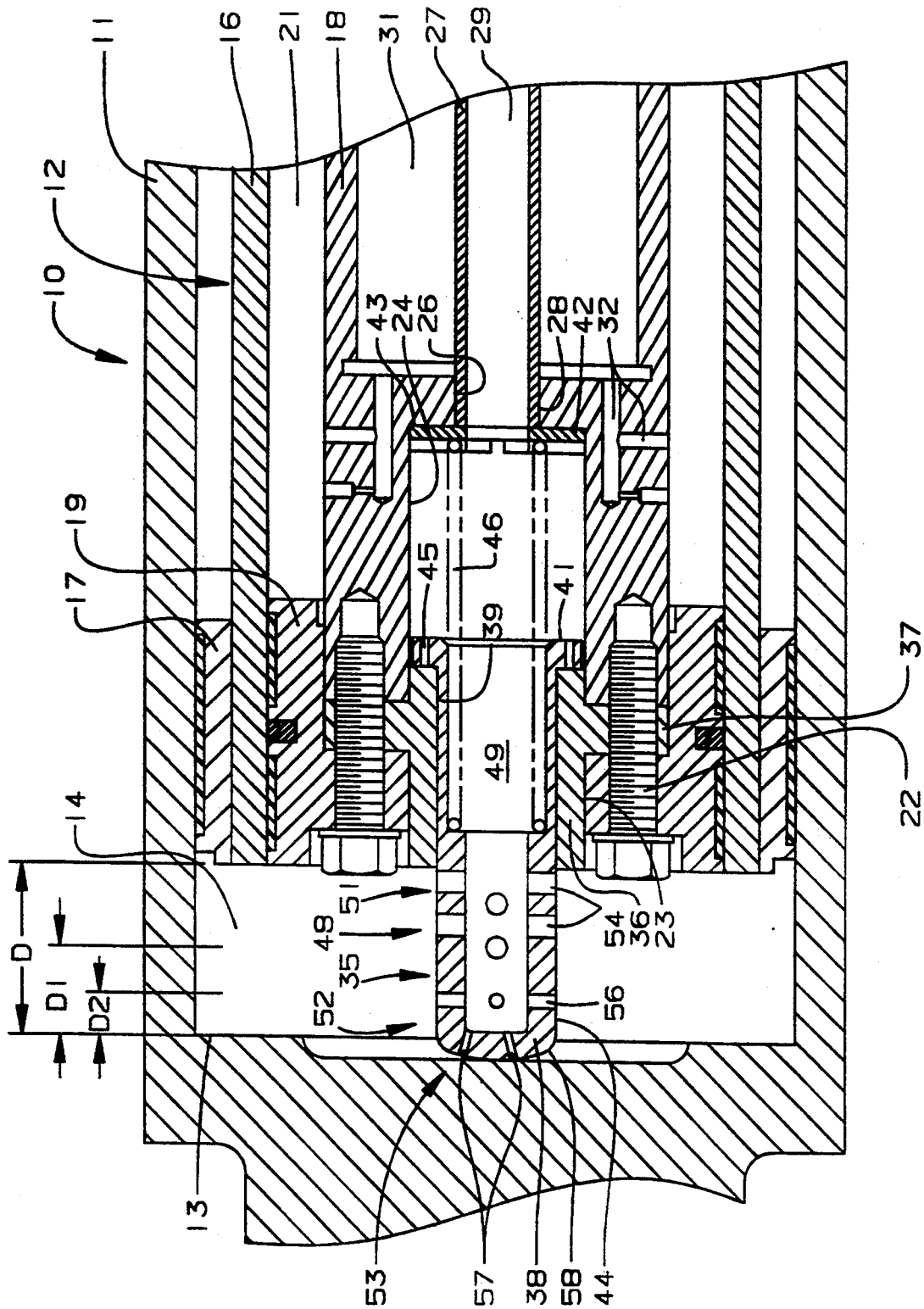

SELF-ENERGIZING SNUBBER FOR A HYDRAULIC MOTOR

TECHNICAL FIELD

This invention relates to a linear hydraulic motor and more particularly to a hydraulic motor having a cushioning device or snubber for dampening inertia loads at the end of stroke movement of a piston of the motor.

BACKGROUND ART

Linear hydraulic motors or jacks are commonly used for moving one member relative to another member. Serious problems can be encountered in the operation of such hydraulic motors as a result of impact of the piston against the end structure of the motor or impact between the members being controlled by the hydraulic motor. Such impacts can disturb work operations, cause undesirable noise and can cause damage to the motor itself or to the members operated thereby if sizable shock forces are generated. To reduce or eliminate such shock forces, hydraulic motors have heretofore been equipped with end of stroke cushioning devices which act essentially to progressively restrict fluid discharged from the motor as the piston approaches the end of travel or the members controlled thereby approach each other.

As heretofore constructed, such cushioning devices normally include a plunger which enters a cavity to establish a restrictive orifice a predetermined distance prior to the hydraulic motor reaching its end of stroke position. The restrictive orifice restricts the flow of fluid discharged from an actuating chamber through an inlet/outlet port of the hydraulic motor until the end of stroke is reached. One of the problems encountered therewith is that once the restrictive orifice is established, it also restricts the passage of actuating fluid from the inlet/outlet port into the actuating chamber until the plunger separates from the cavity. Such restriction slows the response time of the motor when it is actuated in the opposite direction. Another problem encountered with such cushioning devices is that they are not readily adaptable to a telescopic type hydraulic motor commonly used as the hoist motor for raising a truck body relative to the frame. The telescopic motors normally are extended by directing hydraulic fluid through a passage in the piston rod and conversely are retracted by directing the fluid discharged from the actuating chamber through the passage in the piston rod.

Thus, it would be desirable to provide a snubber or cushioning device having good snubbing capabilities at the end of stroke of the hydraulic motor but minimizes the restriction to fluid flow entering the actuating chamber to actuate the motor in the reverse direction and is suitable for use on a telescopic hydraulic motor.

The present invention is directed to overcoming the problems set forth above.

DISCLOSURE OF THE INVENTION

In one aspect of the present invention, a self-energizing snubber is provided for a hydraulic motor having a cylinder and a piston rod assembly reciprocatably mounted within the cylinder defining an actuating chamber adjacent an end surface of the cylinder. The snubber comprises a fluid passage extending longitudinally through the piston rod assembly suitable for transmitting fluid into and out of the actuating chamber and including a bore opening into the actuating chamber. A snubber piston reciprocates within the bore and has an end portion extending into the actuating chamber when the piston rod assembly is spaced from the end surface greater than a predetermined distance. A spring resiliently biases the piston toward the end surface. A variable rate flow path continuously communicates the actuating chamber with the passage. The piston has a first operative position establishing the maximum flow rate through the variable rate flow path, a second operative position establishing a minimum flow rate through the variable rate flow path, and an intermediate position establishing an intermediate flow rate through the variable rate flow path with the intermediate flow rate selected to establish a pressure differential between the actuating chamber and the passage sufficient to energize the piston from the intermediate position to the second position against the bias of the spring. The snubber piston is initially shifted from the first position to the intermediate position by abutment between an end of the snubber piston and the end surface as the piston rod assembly approaches the end surface.

BRIEF DESCRIPTION OF THE DRAWINGS

The sole FIGURE is a cross-sectional view of an embodiment of this invention.

BEST MODE FOR CARRYING OUT THE INVENTION

A telescopic hydraulic motor 10 includes a tubular hydraulic cylinder 11 and a piston rod assembly 12 reciprocatably disposed within the cylinder and movable toward and away from an end surface 13 of the cylinder to define a variable volume actuating chamber 14. The piston rod assembly 12 includes an outer tubular piston rod 16 having a piston 17 suitably secured thereto and slidably disposed within the cylinder 11 and an inner tubular piston rod 18 having a piston 19 slidably disposed within the outer piston rod 16 defining an annular actuating chamber 21. The piston 19 is connected to the inner piston rod 18 by a plurality of bolts 22 and has a bore 23 in axial alignment with a pair of bores 24,26 in the inner piston rod 18. A center tube 27 has an end portion 28 extending into the bore 26 and 10 is suitably mechanically connected to the piston rod 18 to providing a longitudinally extending fluid passage 29 for introducing fluid into and exhausting fluid from the actuating chamber 14. An annular passage 31 is formed between the center tube 27 and the piston rod 18 and is fluidly connected to the actuating chamber 21 through a plurality of ports 32 provided in the piston rod 18.

A self-energizing snubber 35 includes a cylindrical retainer 36 seated in the bores 23,24 and has a radially outwardly extending flange 37 sandwiched between the piston 19 and the inner piston rod 18. A snubber piston 38 is reciprocatably positioned within an axially extending bore 39 in the retainer 36 and has a radially extending flange 41 telescopically disposed between the retainer 36 and a spring guide 42 seated against an annular shoulder 43. The flange 41 has a plurality of holes 45 therein and has its outer surface spaced from the bore 24 to permit fluid transfer from one side to the other during movement of the snubber piston 38. The piston 38 has an end portion 44 extending into the actuating chamber 14 when the piston 19 is spaced from the end surface 13 greater than a predetermined distance D as shown in the drawing. A spring 46 resiliently biases the snubber piston 38 leftwardly toward the end surface 13 with the extent of leftward movement being limited by the flange 41 contacting the retainer 36.

A variable rate flow path 48 continuously communicates the actuating chamber 14 with the passage 29. The snubber piston 38 has a first operative position establishing the maximum flow rate through the variable displacement flow path 48, a second operative position establishing a minimum flow rate through the flow path 48 and an intermediate operative position establishing an intermediate flow rate through the flow path.

The flow path 48 includes, for example, a blind axially extending passage 49 in the snubber piston and opening toward the passage 29, a first variable area orifice means 51 for communicating the passage 49 with the actuating chamber 14 at the first position of the snubber piston and blocked at the intermediate and second positions of the snubber piston, a second variable area orifice means 52 for communicating the passage 49 with the actuating chamber 14 at the first and intermediate positions of the snubber piston and blocked at the second position of the snubber piston, and a fixed area orifice means 53 for continuously communicating the passage 49 with the actuating chamber 14 at all positions of the snubber piston.

The first variable area orifice means 51 includes a first set of radially extending ports 54 passing through a wall of the snubber piston. The second variable area orifice means 52 includes a second set of radial ports 56 passing through the wall and axially spaced from the first set of radial ports 54. The fixed area orifice means 53 includes a plurality of ports 57 passing through the wall and communicating the blind passage 49 with an end surface 58 of the snubber piston. While the variable area orifice means 51,52,53 are shown as ports, alternatively the orifice means can be slots.

Industrial Applicability

In operation, retracting the piston rod assembly 12 is accomplished by venting the hydraulic fluid in the actuating chamber 14 through the flow path 48 and the passage 29 to a fluid source (not shown) while pressurized fluid from the source is directed through the annular passage 31 and the ports 32 into the actuating chamber 21 in any suitable manner. It will be understood that the hydraulic motor in many cases supports a load such that gravitational or other forces can cause the piston rod assembly 12 to move toward the end surface quite rapidly thereby generating high inertia loads. It is also understood that during the final stage of retraction, the relationship of the outer and inner piston rods 16 and 18 and the associated components are essentially as shown in the drawing.

The snubber piston 38 is normally resiliently biased to the first operative position shown by the spring 46 when the piston 19 is spaced from the end surface 13 at or greater than the preselected distance D. The size of the first and second set of radial ports 54 and 56 and the ports 57 is selected so that when the hydraulic motor is being retracted, the fluid exhausted from the actuating chamber 14 passes through the flow path 48 at its maximum substantially unrestricted flow rate when the snubber piston 38 is at the first operative position. When the piston 19 reaches the predetermined distance D, the end 58 of the snubber piston contacts the end surface 13 causing the snubber piston to stop. Continued movement of the piston 19 causes the retainer 36 to sequentially block the ports 54 so as to cause the escape path of fluid from the actuating chamber 14 to be progressively restricted. When the piston 19 reaches a preselected distance D1 from the end surface, the snubber piston 38 reaches its intermediate position such that fluid flow through the ports 54 becomes completely blocked and the fluid being exhausted from the actuating chamber 14 must then pass through the ports 56 and 57 establishing the intermediate flow rate. The combined effective area of the ports 56 and 57 is selected to establish a pressure differential between the actuating chamber 14 and the passage 29 sufficient to energize or hydraulically move the snubber piston 38 inwardly relative to the retainer 36 to the second operative position against the bias of the spring 46. The fluid being exhausted from the actuating chamber 14 now must pass through only the ports 57 at the minimum flow rate so that retracting movement of the piston rod assembly 12 is quickly decelerated during the last stages of the retracting stroke to stop the piston rod assembly in a smooth controlled manner so as to alleviate any substantial impact at the end of stroke movement of the piston rod assembly.

In this embodiment, the end of stroke movement is determined by physical contact between the members (not shown) to which the hydraulic motor is associated. The end of stroke movement happens when the piston 19 reaches a predetermined distance D2 relative to the end surface. Once the piston rod assembly has reached its end of stroke movement and fluid is no longer being exhausted through the ports 57, the pressures in the chamber 14 and the passage 29 equalize allowing the spring 46 to move the snubber piston 38 to its intermediate position. Thus, when fluid is subsequently directed through the passage 29 to extend the hydraulic motor, the fluid initially passes through the ports 56 and 57 to pressurize the actuating chamber 14. Once the piston 19 has moved beyond the predetermined distance D and the snubber piston reaches its first operating position, the fluid can pass through the flow path 48 substantially unrestricted.

In view of the above, it is readily apparent that the structure of the present invention provides an improved self-energizing snubber effective in decelerating the movement of the piston rod assembly in the last stages of the retracting stroke for stopping the piston rod assembly in a smooth controlled manner while minimizing the restriction to oil passing into the actuating chamber for extending the hydraulic motor after the piston rod assembly has come to its end of stroke movement.

Other aspects, objects and advantages of this invention can be obtained from a study of the drawings, the disclosure and the appended claims.

We claim:

1. A self-energizing snubber for a hydraulic motor having a cylinder and a piston rod assembly reciprocatably mounted within the cylinder defining an actuating chamber adjacent an end surface, the piston rod assembly having a fluid passage therein as the only means for transmitting hydraulic fluid into and out of the actuating chamber, comprising:

means defining a bore opening into the actuating chamber;

a snubber piston reciprocatably disposed within the bore and having an end portion extending into the actuating chamber when the piston is spaced from the end surface greater than a predetermined distance;

a spring resiliently biasing the snubber piston toward the end surface; and means defining a variable rate flow path in the snubber piston for continuously communicating the actuating chamber with the passage, the snubber piston having a first operative position establishing a maximum flow rate through the flow path, a second operative position establishing a minimum flow rate through the flow path, and an intermediate operative position establishing an intermediate flow rate through the flow path, the snubber piston being initially shifted from the first position to the intermediate position by abutment between an end of the snubber piston and the end surface as the piston rod assembly approaches the end surface, the intermediate flow rate being selected to establish a pressure differential between the actuating chamber and the passage sufficient to move the snubber piston away from the end surface to the second position against the bias of the spring.

2. The self-energizing snubber of claim 1 wherein the flow path includes a blind axially extending bore in the snubber piston opening toward the passage, a first variable area orifice means for communicating the blind bore with the actuating chamber at the first operative position and being blocked at the intermediate and second operative positions, a second variable area orifice means for communicating the blind bore with the actuating chamber at the first and intermediate operative positions of the snubber piston and being blocked at the second position, and a fixed area orifice means for continuously communicating the blind bore with the actuating chamber at all positions of the snubber piston.

3. The self-energizing snubber of claim 2 wherein the first variable area orifice means includes a first set of radial ports extending through a wall of the snubber piston, the second variable area orifice means includes a second set of radial ports extending through the wall of the snubber piston, and the fixed area orifice means includes at least one port continuously communicating the blind bore with the actuating chamber.

4. The self-energizing snubber of claim 3 wherein the piston rod assembly includes a second bore and a retainer having the first bore defined therein, the retainer being seated within the second bore.

5. The self-energizing snubber of claim 4 wherein the piston rod assembly includes a piston rod and a piston connected thereto, the retainer having a radially outwardly extending flange positioned between the piston and the piston rod.

* * * * *